(12) United States Patent
Sterbenz et al.

(10) Patent No.: US 10,290,933 B2
(45) Date of Patent: May 14, 2019

(54) ANTENNA AND ACCESSORY MOUNTING DEVICE FOR A MOTOR VEHICLE

(71) Applicant: FORD GLOBAL TECHNOLOGIES, LLC, Dearborn, MI (US)

(72) Inventors: Scott Christopher Sterbenz, Brownstown, MI (US); Gary Lee Danhoff, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 15/017,953

(22) Filed: Feb. 8, 2016

(65) Prior Publication Data

US 2017/0229766 A1    Aug. 10, 2017

(51) Int. Cl.
| | | |
|---|---|---|
| *H01Q 1/32* | (2006.01) | |
| *H01Q 1/12* | (2006.01) | |
| *H01Q 9/32* | (2006.01) | |
| *B60R 11/00* | (2006.01) | |

(52) U.S. Cl.
CPC ........... *H01Q 1/325* (2013.01); *H01Q 1/1207* (2013.01); *H01Q 1/1214* (2013.01); *H01Q 1/32* (2013.01); *H01Q 1/3258* (2013.01); *H01Q 1/3275* (2013.01); *H01Q 1/3283* (2013.01); *H01Q 1/3291* (2013.01); *H01Q 9/32* (2013.01); *B60R 2011/004* (2013.01); *B60R 2011/007* (2013.01); *B60R 2011/0057* (2013.01)

(58) Field of Classification Search
CPC ...... H01Q 1/3275; H01Q 1/3291; H01Q 1/32; H01Q 1/325; H01Q 1/3283; H01Q 1/1214; H01Q 1/1271; H01Q 1/1207; B60R 2011/0057; B60R 2011/007; B60R 2011/004

USPC .......................................... 343/713, 715, 892
See application file for complete search history.

(56) References Cited

U.S. PATENT DOCUMENTS

| | | | | |
|---|---|---|---|---|
| 3,148,856 A | * | 9/1964 | Orlando | ..................... G09F 1/14 116/173 |
| 3,241,516 A | * | 3/1966 | Hopkins | ............... H01F 7/0252 116/173 |
| 3,369,247 A | * | 2/1968 | Bacow | ................ H01Q 1/3258 174/151 |
| 4,028,705 A | * | 6/1977 | Loyd | ..................... H01Q 1/3258 248/224.7 |
| 4,035,806 A | * | 7/1977 | Powell | ................. H01Q 1/3258 248/539 |
| 4,037,229 A | * | 7/1977 | Dunk | ..................... F16M 11/14 248/288.31 |
| 4,065,092 A | | 12/1977 | Spinks, Sr. et al. | |
| 4,109,252 A | | 8/1978 | Hacker et al. | |
| (Continued) | | | | |

*Primary Examiner* — Dameon E Levi
*Assistant Examiner* — Ab Salam Alkassim, Jr.
(74) *Attorney, Agent, or Firm* — Jason Rogers; Vichit Chea; King & Schickli, PLLC

(57) ABSTRACT

An antenna mounting device is provided for a motor vehicle. That antenna mounting device includes a body having a first mounting end with a first cross section and a second mounting end with a second, different cross section. In addition, the antenna mounting device includes an antenna anchor point carried on the body and adapted to receive and hold an antenna. The two mounting sections allow versatility in mounting the antenna mounting device in different structures carried on the motor vehicle including, for example, a stake pocket and a trailer hitch receiver.

16 Claims, 7 Drawing Sheets

(56) References Cited

U.S. PATENT DOCUMENTS

| | | | | |
|---|---|---|---|---|
| 4,110,757 A * | 8/1978 | Sieber | H01Q 1/3258 | 343/713 |
| 4,114,159 A | 9/1978 | Verini | | |
| 4,114,160 A * | 9/1978 | Verini | H01Q 1/3258 | 248/539 |
| 4,150,381 A * | 4/1979 | Verini | H01Q 1/3258 | 248/222.12 |
| 4,151,533 A * | 4/1979 | Vogt | H01Q 1/3258 | 248/539 |
| 4,158,844 A * | 6/1979 | Wood | H01Q 1/3258 | 248/539 |
| 4,173,761 A * | 11/1979 | Liautaud | H01Q 1/12 | 343/715 |
| 4,198,636 A * | 4/1980 | Canterbury | H01Q 1/084 | 343/715 |
| 4,209,788 A * | 6/1980 | Plantier | H01Q 1/3258 | 343/713 |
| 4,249,182 A * | 2/1981 | Rupley | H01Q 1/1235 | 248/539 |
| 4,574,726 A * | 3/1986 | Sullivan | B60R 13/005 | 116/174 |
| 4,632,354 A * | 12/1986 | Asciutto | B62J 99/00 | 116/173 |
| 4,685,646 A * | 8/1987 | Harrison | B60P 7/14 | 248/231.61 |
| 4,927,117 A * | 5/1990 | Gainey | A45B 11/00 | 135/88.01 |
| 5,020,765 A * | 6/1991 | Evans | H01Q 1/3258 | 248/231.71 |
| 5,031,874 A * | 7/1991 | Shannon | A47G 1/17 | 248/683 |
| 5,157,409 A * | 10/1992 | Hamin | H01Q 1/088 | 343/715 |
| 5,389,942 A * | 2/1995 | Oglesby, Jr. | H01Q 1/42 | 248/206.5 |
| 5,483,916 A * | 1/1996 | Kolvites | F16M 11/10 | 116/173 |
| 5,561,439 A * | 10/1996 | Moilanen | H01Q 1/3275 | 343/745 |
| 5,583,522 A * | 12/1996 | Radomski | H01Q 1/1214 | 343/715 |
| 5,585,151 A * | 12/1996 | Bruning | B60R 13/005 | 280/727 |
| 5,892,488 A | 4/1999 | Dulon | | |
| 5,961,092 A * | 10/1999 | Coffield | H01Q 1/125 | 248/230.1 |
| 5,995,053 A * | 11/1999 | Curtis | H01Q 1/1207 | 343/713 |
| 6,557,483 B2 * | 5/2003 | Nathan | B60D 1/36 | 116/173 |
| 6,808,098 B1 * | 10/2004 | Bickett, III | B60D 1/36 | 116/173 |
| 7,030,822 B1 * | 4/2006 | Grabowski | H01Q 1/1207 | 248/539 |
| 7,121,585 B2 * | 10/2006 | Cole | B60Q 1/2661 | 280/748 |
| 7,266,431 B2 * | 9/2007 | Jackson | B60Q 1/2657 | 362/459 |
| 7,594,478 B2 * | 9/2009 | Karnes | B62D 33/0207 | 116/173 |
| 8,475,098 B2 * | 7/2013 | Marlow | B60Q 1/2634 | 292/257 |
| 9,159,254 B2 * | 10/2015 | Oyoung | G09F 17/00 | |
| 9,200,729 B2 * | 12/2015 | Hobbs | F16L 3/006 | |
| 9,620,845 B1 * | 4/2017 | Sullivan | H01Q 1/1228 | |
| 9,630,304 B1 * | 4/2017 | Nolan, III | E21B 7/02 | |
| 9,688,127 B2 * | 6/2017 | Hemphill | B60J 7/104 | |
| 9,701,254 B2 * | 7/2017 | O'Regan | B60R 9/00 | |
| 9,914,403 B1 * | 3/2018 | Richardson | B60R 11/00 | |
| 2002/0063438 A1 * | 5/2002 | Rusu | B60J 7/1621 | 296/100.07 |
| 2002/0148124 A1 * | 10/2002 | Strange | B60D 1/36 | 33/264 |
| 2003/0016185 A1 * | 1/2003 | Morooka | H01Q 1/3275 | 343/895 |
| 2003/0057676 A1 * | 3/2003 | Griggs | B60D 1/52 | 280/504 |
| 2003/0094473 A1 * | 5/2003 | Moore | B60R 9/06 | 224/519 |
| 2003/0164437 A1 * | 9/2003 | Wilson | G09F 17/00 | 248/539 |
| 2003/0205599 A1 * | 11/2003 | Brown | B60R 9/06 | 224/401 |
| 2003/0213881 A1 * | 11/2003 | McCoy | B60P 1/00 | 248/309.1 |
| 2005/0093762 A1 | 5/2005 | Pick | | |
| 2005/0146483 A1 * | 7/2005 | Levasseur | H01Q 1/3283 | 343/878 |
| 2006/0027719 A1 * | 2/2006 | Klein | H01Q 1/1221 | 248/158 |
| 2006/0119124 A1 * | 6/2006 | Briggs | B60J 7/1614 | 296/26.06 |
| 2006/0261815 A1 * | 11/2006 | Martin | G01C 15/12 | 324/330 |
| 2008/0054136 A1 * | 3/2008 | Gou | F16B 47/00 | 248/205.5 |
| 2008/0303740 A1 * | 12/2008 | Schipper | H01Q 1/1214 | 343/878 |
| 2009/0079640 A1 * | 3/2009 | Gray | H01Q 1/3275 | 343/713 |
| 2010/0220021 A1 * | 9/2010 | Khreizat | H01Q 1/1214 | 343/715 |
| 2011/0140474 A1 * | 6/2011 | Smith | B60R 13/0206 | 296/35.1 |
| 2012/0085269 A1 * | 4/2012 | Ohide | A47B 31/06 | 108/44 |
| 2012/0292360 A1 * | 11/2012 | O'Regan | B60R 5/04 | 224/567 |
| 2012/0318189 A1 * | 12/2012 | Oyoung | G09F 17/00 | 116/173 |
| 2013/0176182 A1 * | 7/2013 | Stolz | H01Q 1/3283 | 343/713 |
| 2014/0319298 A1 * | 10/2014 | O'Regan | B60R 9/00 | 248/224.7 |
| 2015/0283957 A1 * | 10/2015 | Dickinson | F16B 5/123 | 24/303 |
| 2016/0001711 A1 * | 1/2016 | Hughes | B60D 1/58 | 224/403 |
| 2016/0082880 A1 * | 3/2016 | Co | B60Q 1/2611 | 701/2 |
| 2016/0259374 A1 * | 9/2016 | Breiwa | H02J 50/10 | |
| 2017/0106809 A1 * | 4/2017 | Tirrell | F16B 1/00 | |
| 2017/0151844 A1 * | 6/2017 | Stanifer | B60D 1/187 | |
| 2018/0111562 A1 * | 4/2018 | Crandall | B60R 9/06 | |
| 2018/0245734 A1 * | 8/2018 | Kim | F16M 13/022 | |

* cited by examiner

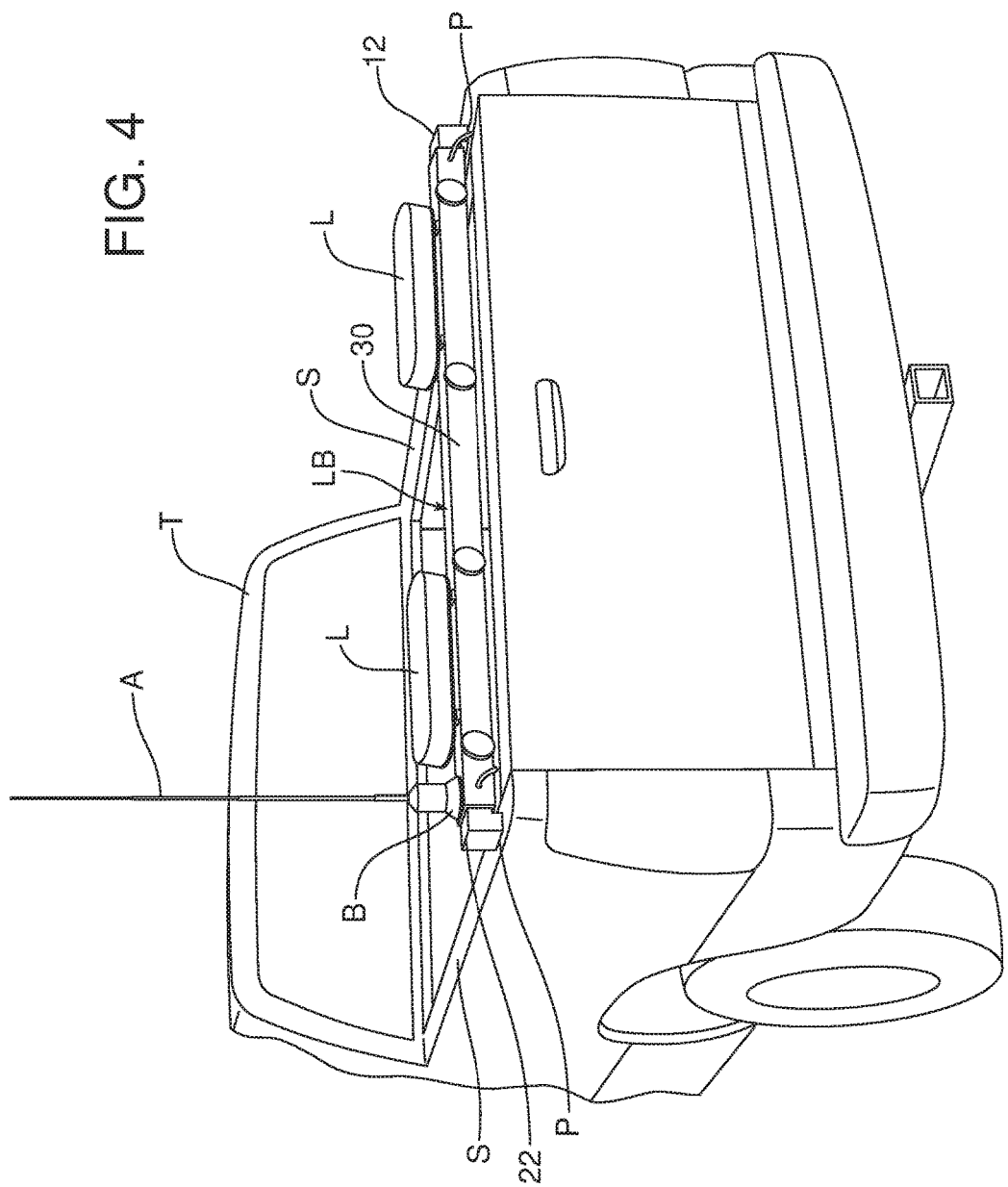

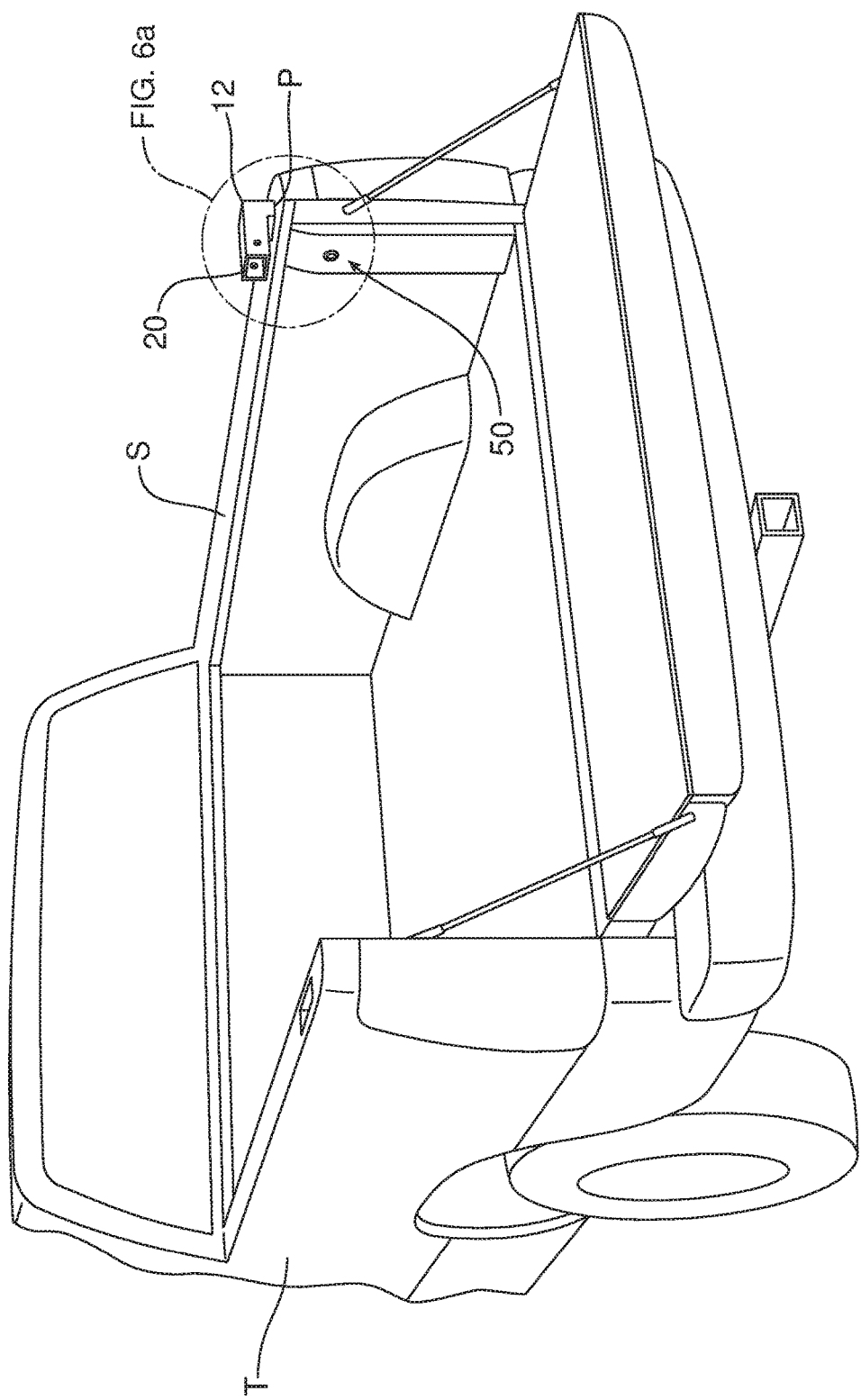

ANTENNA AND ACCESSORY MOUNTING DEVICE FOR A MOTOR VEHICLE

TECHNICAL FIELD

This document relates generally to the motor vehicle equipment field and, more particularly, to an antenna mounting device for a motor vehicle that may be used in a number of different configurations in order to mount an antenna and, if desired, additional accessories to a motor vehicle.

BACKGROUND

Operators of HAM and CB radios are always searching for good locations to mount the HAM and CB radio antennas to their motor vehicles. With the introduction of aluminum bodied vehicles, the ability to mount magnetic based antennas to the hood, roof and bed of the motor vehicle has been compromised. This document relates to a new and improved antenna mounting device that may be utilized in a number of different configurations to mount not only an antenna but other accessories at different, advantageous locations on a motor vehicle. Such a device is particularly useful with pickup trucks including those incorporating aluminum bodies.

SUMMARY

An antenna mounting device is provided for a motor vehicle. That antenna mounting device comprises a body having a first mounting end of a first cross section and a second mounting end of a second, different cross section. The antenna mounting device also includes an antenna anchor point carried on that body and adapted to receive and hold an antenna. The body may be made from a lightweight, non-ferromagnetic material while the antenna anchor point may be made from a ferromagnetic material adapted to contact and hold a magnetic base on an antenna to be secured in position by the mounting device.

The body may include a first leg and a second leg. The first mounting end may be provided on the first leg while the second mounting end may be provided on the second leg. Further, the body may be L-shaped.

The antenna mounting device may further include a second body having a third mounting end with the first cross section and a fourth mounting end with the second cross section. In addition, the antenna mounting device may also include an accessory bar that is connected between the body and the second body. In such an embodiment, the body, the second body and the accessory bar may all be made of lightweight non-ferromagnetic material while the antenna anchor point may be made from ferromagnetic material. In addition, a second antenna anchor point may be carried on the second body and adapted to receive and hold the antenna. Still further, the antenna mounting device may include a third antenna anchor point carried on the accessory bar that is also adapted to receive and hold an antenna. More specifically, that accessory bar may include a first end received over the second mounting end and a second end received over the fourth mounting end.

In accordance with an additional aspect, a truck is provided that is equipped with the antenna mounting device set forth in this document. That antenna mounting device may be mounted to the truck by inserting the first mounting end into a stake pocket of the truck or inserting the second mounting end into a trailer hitch receiver carried on the truck. Thus, it should be appreciated that the antenna mounting device provides the necessary versatility to allow the mounting of an antenna to the truck at various locations as suited to the particular needs and applications of the user.

In accordance with still another aspect, a method is provided for mounting an antenna to a motor vehicle using an antenna mounting device having a first mounting end with a first cross section and a second mounting end of a second, different cross section. That method comprises the steps of: (a) securing the antenna mounting device to the motor vehicle by either engaging the first mounting end within a first structure of the motor vehicle or engaging the second mounting end in a second structure of the motor vehicle and (b) mounting an antenna to an antenna anchor point carried on the antenna mounting device.

The method may further include the step of inserting the first mounting end into a stake pocket of a motor vehicle. Alternatively, the method may include the step of inserting the second mounting end into a hitch receiver carried on the motor vehicle.

In addition, the method may include securing a magnetic base of an antenna to the antenna anchor point which may be made from a ferromagnetic material in order to provide magnetic attraction to the magnetic base.

Still further, the method may include the steps of: (a) securing a first component of the antenna mounting device in a first stake pocket of the motor vehicle and a second component of said antenna mounting device in a second stake pocket of the motor vehicle on an opposite side of the motor vehicle from the first stake pocket and (b) connecting an accessory bar between the first and second components of the antenna mounting device so that the accessory bar bridges a payload bed of the motor vehicle. Still further, the method may also include the step of securing the antenna mounting device in the first stake pocket of the motor vehicle by means of a latch mechanism.

In the following description, there are shown and described several preferred embodiments of the antenna mounting device as well as its method of use. As it should be realized, the antenna mounting device and related method are capable of other, different embodiments and their several details are capable of modification in various, obvious aspects all without departing from the device and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the antenna mounting device and together with the description serve to explain certain principles thereof. In the drawing figures:

FIG. 4 illustrates a configuration wherein two L-shaped bodies or components are secured in opposed stake pockets of a pickup truck with an accessory bar connecting those two components and bridging the load bed of the pickup truck. An antenna and other accessories are shown mounted to the device.

FIG. 5 is a perspective view illustrating an L-shaped body or component received in a stake pocket of a pickup truck including a locking mechanism.

Reference will now be made in detail to the present preferred embodiments of the antenna mounting device, examples of which are illustrated in the accompanying drawing figures.

DETAILED DESCRIPTION

Figure 1:
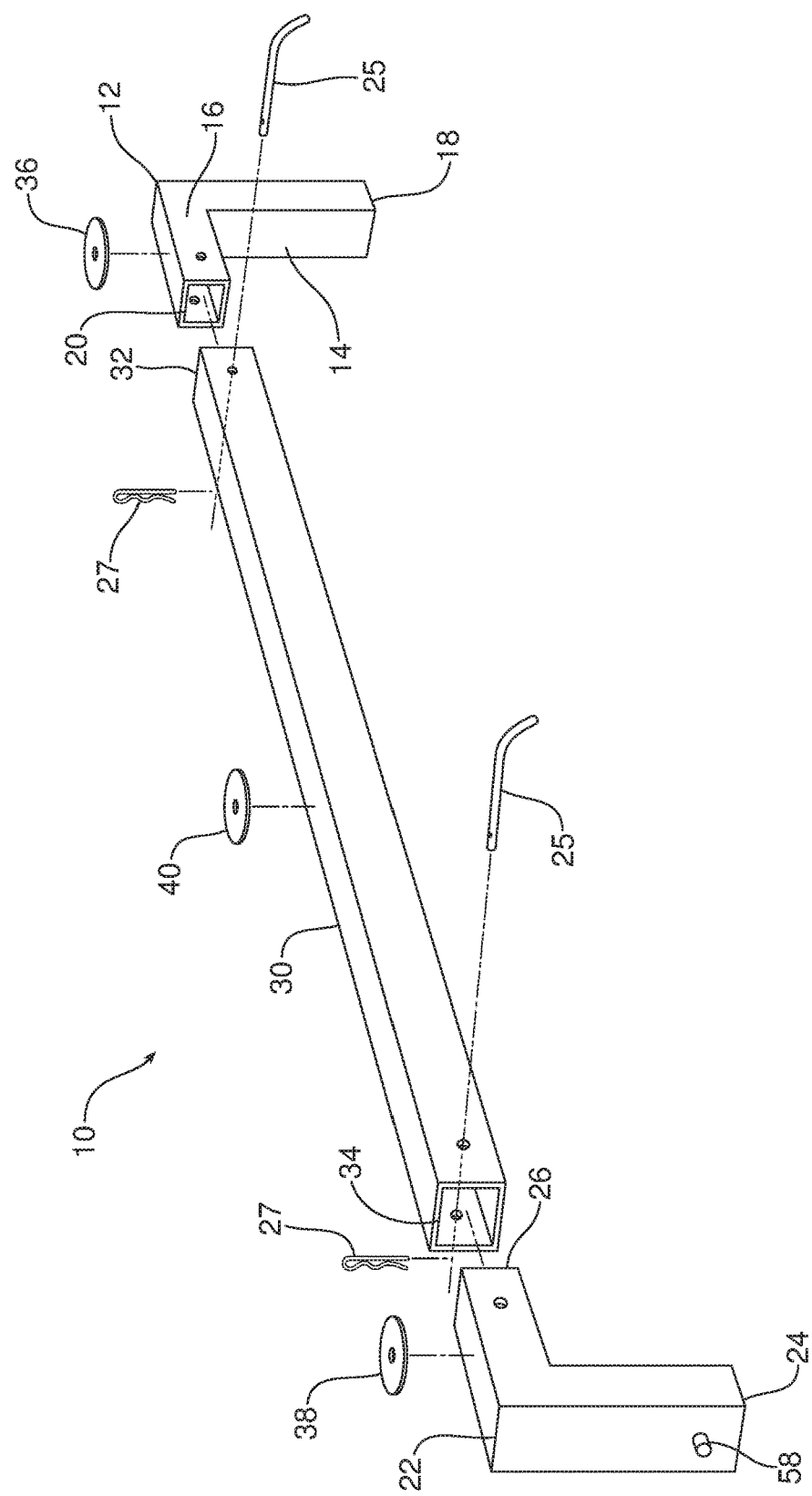
FIG. 1 is an exploded perspective view of the antenna mounting device including two L-shaped bodies or components, an accessory bar for connecting and bridging between those two components and two pull pins for securing all three components together.

Reference is now made to FIG. 1 illustrating the antenna mounting device 10 particularly adapted for mounting one or more antenna A and, if desired, additional accessories to a motor vehicle such as a pickup truck T. As illustrated, the antenna mounting device includes a first body or component 12 of substantially L-shape having a first leg 14 and a second leg 16. A first mounting end 18 is provided on the first leg 14 while a second mounting end 20 is provided on the second leg 16.

As should be appreciated, in the illustrated embodiment, the first mounting end 18 has a first cross section while the second mounting end 20 has a second, different cross section. In one possible embodiment, the first mounting end 18 has a cross section of 2.0 inches by 1.5 inches while the second mounting end 20 has a cross section of 2.0 inches by 1.875 inches. As will be appreciated from the following description, a first mounting end 18 with such a cross section is particularly adapted and shaped to be received in a stake pocket P in the sidewall S of the pickup truck T (see FIG. 2). In contrast, the second mounting end 20 with such a cross section is particularly adapted and shaped to be received and held in a hitch receiver opening of a trailer hitch receiver R secured to the pickup truck T (see FIG. 3).

As further illustrated in FIG. 1, the antenna mounting device includes a second body or component 22. That second body 22 is L-shaped and includes a third mounting end 24 and a fourth mounting end 26. In the illustrated embodiment, the third mounting end 24 has a cross section matching the first mounting end 18 while the fourth mounting end 26 has a cross section matching the second mounting end 20.

As further illustrated in FIG. 1, the antenna mounting device 10 also includes an accessory bar 30 that may be connected between the first body or component 12 and the second body or component 22 in a manner that will be described in greater detail below. More specifically, the accessory bar 30 includes a first end 32 sized and shaped to be received over the second mounting end 20 of the first body 12 and a second end 34 sized and shaped to be received over the fourth mounting end 26. Cooperating pins 25 and spring clips 27 complete the connection of the components.

In the illustrated embodiment, an antenna anchor point 36, in the form of a metal disc, is carried on/secured to the first body 12. Similar antenna anchor points 38, 40 may be carried on/secured to, respectively, the second body 22 and the accessory bar 30 if desired. In one possible embodiment, the first body 12, the second body 22 and even the accessory bar 30 may all be made of a lightweight, non-ferromagnetic material for ease of handling when assembling or disassembling the antenna mounting device 10. In such an embodiment, the antenna anchor points or discs 36, 38 and 40 may all be made of a ferromagnetic material such as steel to provide for magnetic attraction with any antenna A including a magnetic base B.

Figure 2:
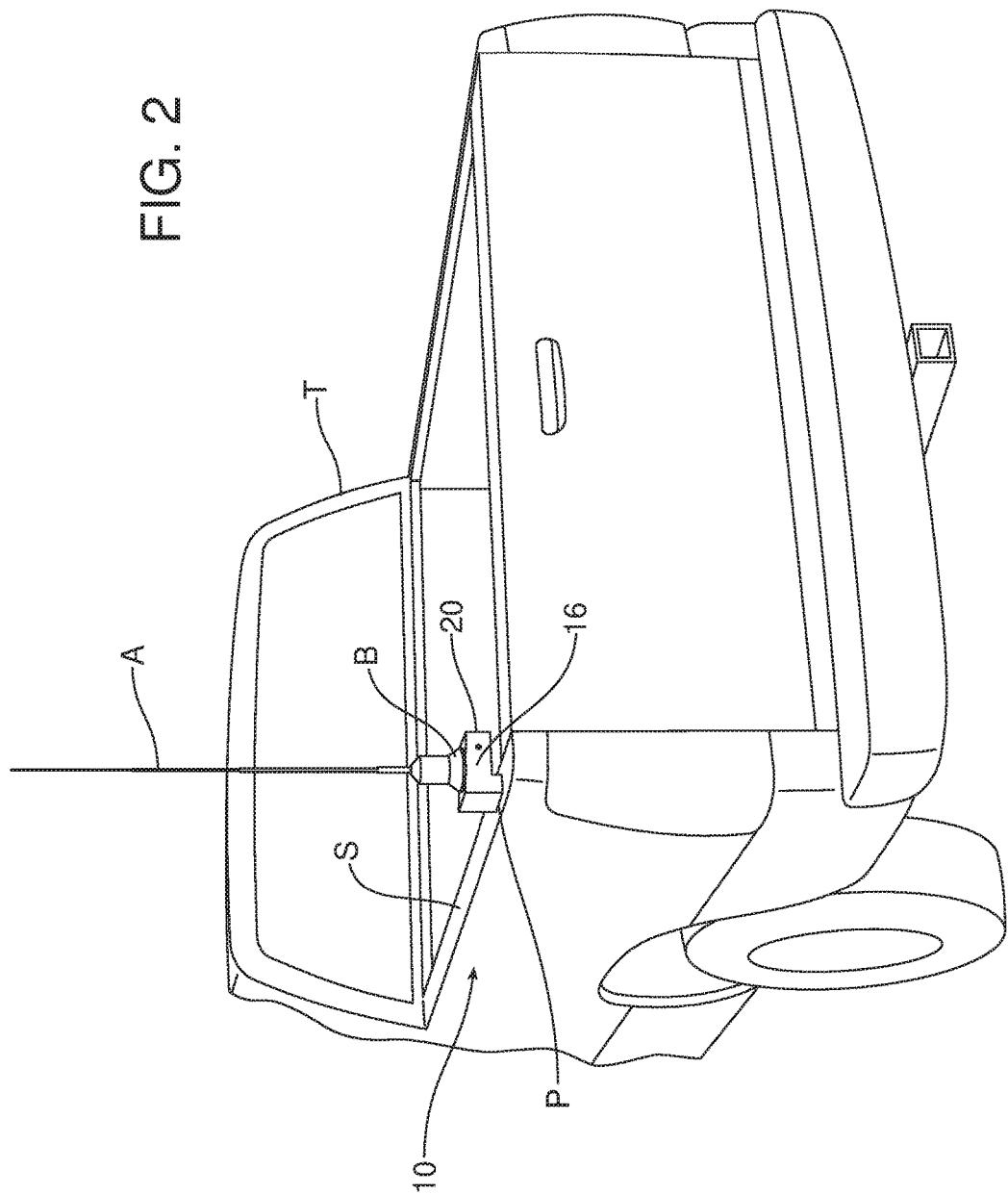
FIG. 2 is a perspective view illustrating a single L-shaped body or component received within a stake pocket of a pickup truck and supporting an antenna.

Reference is now made to FIG. 2 illustrating the antenna mounting device 10 in a first configuration for mounting an antenna A in a stake pocket P of a sidewall S of the pickup truck T. In order to do this, the first mounting end 18 of the body 12 is inserted down into the stake pocket P. As previously noted, the first mounting end 18 is sized and shaped to nest in the stake pocket P. The antenna A is then secured to the antenna anchor point or disc 36 carried on the body 12. In the illustrated embodiment, the magnetic base B of the antenna A fits within a circular cavity formed within the top face of the antenna anchor point/disc 36 to which the base is magnetically attracted. A screw or other appropriate fastener (not shown) may be utilized to complete a secure connection.

Figure 3:
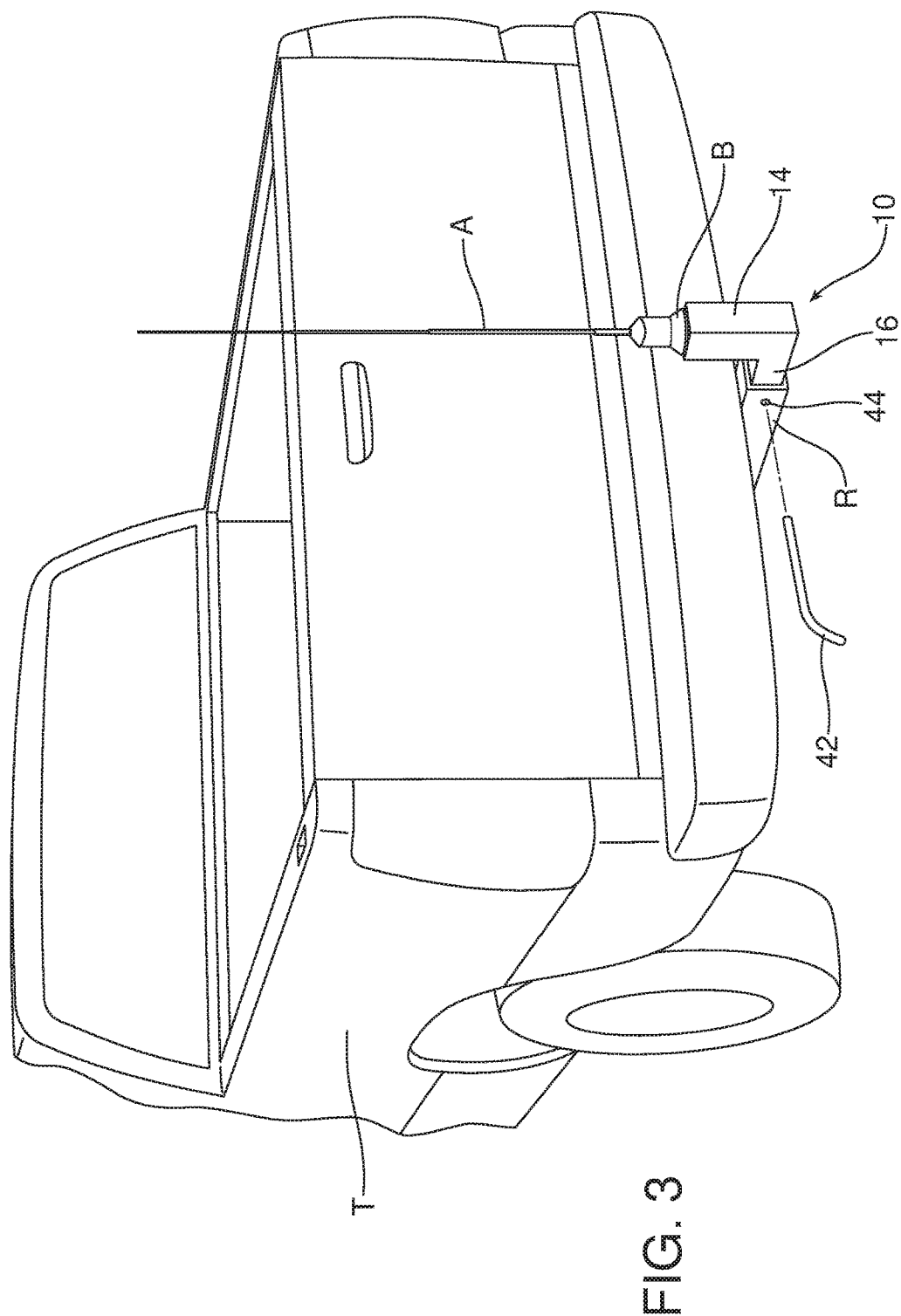
FIG. 3 is a perspective view illustrating a single L-shaped body or component mounted in a trailer hitch receiver of the motor vehicle and supporting an antenna.

Reference is now made to FIG. 3 illustrating a second configuration of the antenna mounting device 10 useful in securing an antenna A to a pickup truck T. In this configuration the antenna mounting device 10 is secured to a trailer hitch receiver R that is mounted to the pickup truck T. More specifically, the second mounting end 20 of the body 12 is inserted into the hitch receiver R and a hitch pin 42 is inserted through aligned cooperating apertures in the walls of the hitch receiver R and the body 12 (note aperture 44 in FIG. 2).

Reference is now made to FIG. 4 illustrating yet another configuration of the antenna mounting device 10 for securing an antenna A as well as other accessories (note light clusters L) to the pickup truck T. Toward this end, the second mounting end 20 of the first body or component 12 is inserted in the first end 32 of the accessory bar and secured in place with a pin 25 and a spring clip 27. Similarly, the fourth mounting end 26 of the second body or component 22 is inserted in the second end 34 of the accessory bar 30 and secured in place with a pin 25 and a spring clip 27. Next, the first mounting end 18 of the first body or component 12 is inserted into a first stake pocket P in a first sidewall S of the pickup truck T. Substantially simultaneously, the fourth mounting end 26 of the second body or component 22 is inserted into a second stake pocket P of the pickup truck T in the other sidewall S opposite the first stake pocket P. When the antenna mounting device 10 is properly seated in the opposed the stake pockets P, the accessory bar 30 bridges the load bed LB of the pickup truck T. As illustrated one or more antenna A, one or more light sets L or other desired accessories may be secured to the antenna mounting device 10 as desired and mounted to the motor vehicle in this convenient and efficient manner.

Figure 6A:
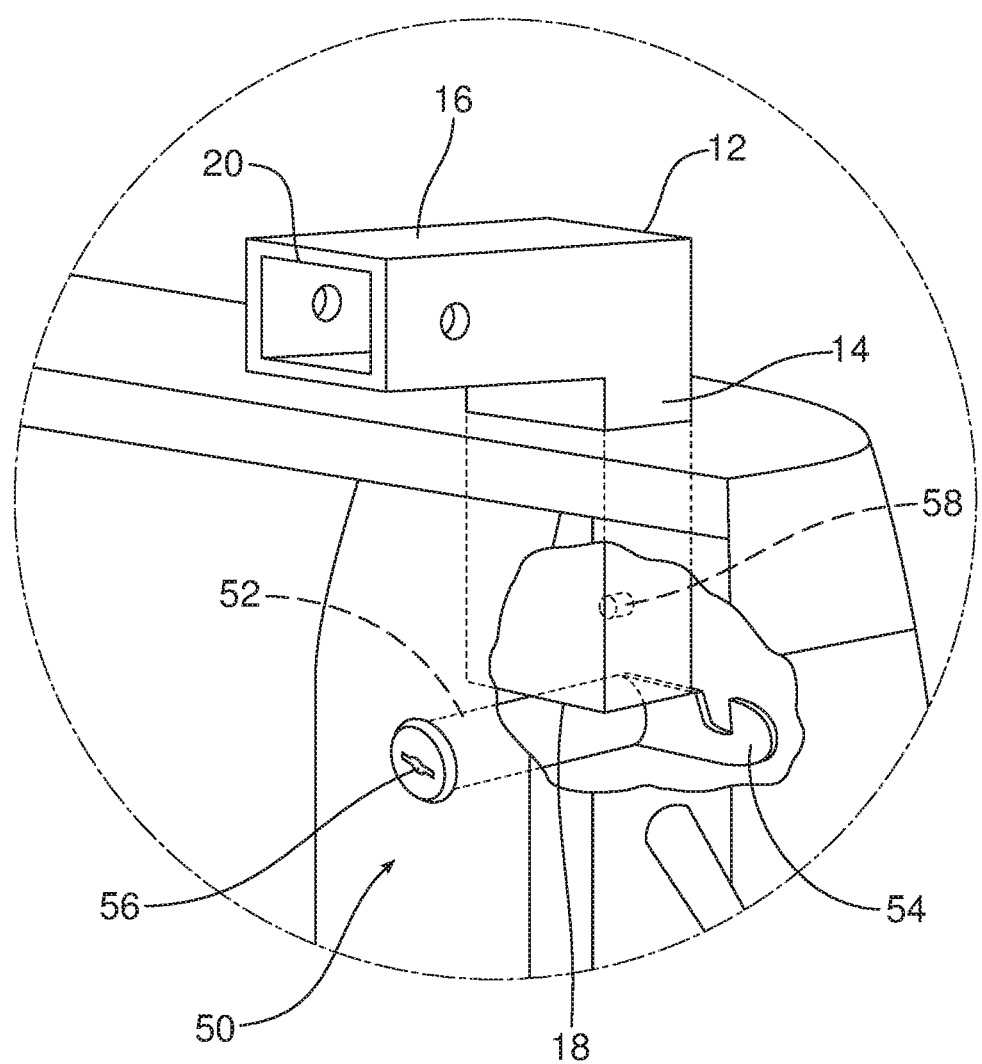
FIGS. 6a and 6b are detailed views of the structure illustrated in FIG. 5 showing the locking mechanism in respective unlocked and locked positions.
Figure 6B:
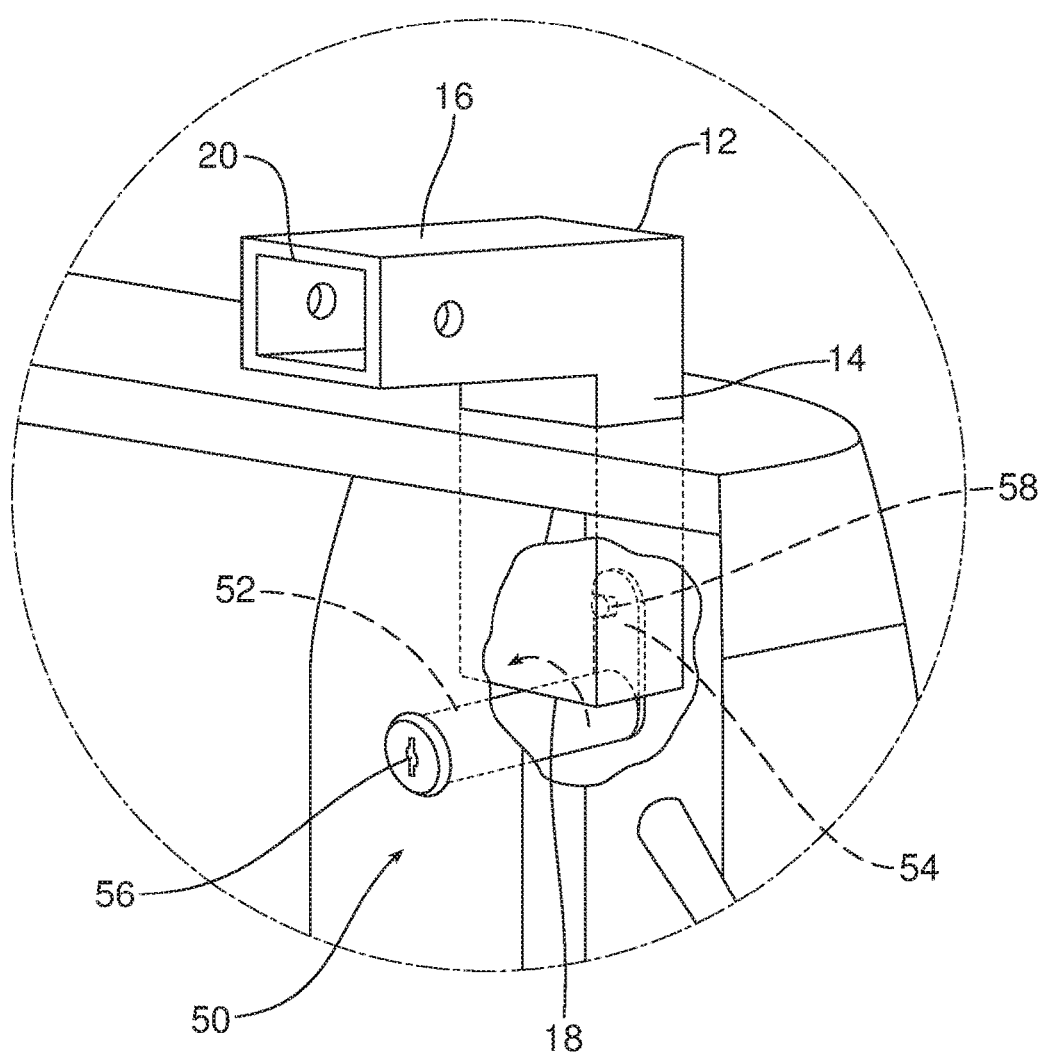

Reference is now made to FIGS. 5, 6a and 6b illustrating a latch mechanism 50 for locking either body 12 or 22 into a stake pocket P of the pickup truck T. As illustrated, the latch mechanism 50 includes a key cylinder 52 and rotary latch 54. In use, the user inserts a key (not shown) into the key slot 56 of the key cylinder 52 and turns the rotary latch 54 into an unlatched position so as to provide clearance for insertion of the body 12 or 22 into the stake pocket P. See FIG. 6a showing the rotary latch in the unlocked position. After the body 12 or 22 is fully inserted and seated in the stake pocket P, the user turns the key cylinder 52 to rotate the rotary latch 54 into a locking position where the latch engages with a strike element 58 provided on the body 12 or 22. See FIG. 6b showing the rotary latch 54 in the locked position engaging the strike element 58. The key is then removed from the key cylinder 52. The interference engagement of the rotary latch 54 with the strike element 58 functions to secure the body 12 or 22 in the stake pocket P to prevent removal and theft of the body 12 or 22.

Consistent with this description, it should be appreciated that the antenna mounting device 10 is useful in a method of mounting an antenna A to a motor vehicle or truck T. That method may be described as comprising the steps of: (a) securing an antenna on a mounting device 10 to the motor vehicle T by either engaging the first mounting end 18 of the body or component 12 within a first structure of the motor vehicle or engaging the second mounting end 20 in a second structure of the motor vehicle and (b) mounting an antenna A to the antenna anchor point 36 carried on the antenna mounting device 10.

In one possible configuration illustrated in FIG. 2, the first mounting end 18 is inserted into a stake pocket P of the motor vehicle or truck T. In another possible configuration illustrated in FIG. 3, the second mounting end 20 is inserted into a trailer hitch receiver R carried on the motor vehicle or truck T.

In a third configuration illustrated in FIG. 4, the method may include securing first and second bodies or components 12, 22 of the antenna mounting device 10 into first and second stake pockets P of the motor vehicle or truck T on opposite sides of the truck and bridging a load bed LB of the motor vehicle or truck with an accessory bar 30. Further, the method may include securing the antenna mounting device 10 in the first stake pocket P by means of a latch mechanism 50 as illustrated in FIG. 5. In addition, the method may include securing a magnetic base B on an antenna A to an antenna anchor point 36, 38 or 40 which may be made from a ferromagnetic material.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An antenna mounting device for a motor vehicle, comprising:
   a non-ferromagnetic one-piece L-shaped body having a first mounting end with a first cross section and a second mounting end with a second, different cross section; and
   a ferromagnetic antenna anchor disc carried on said body and adapted to receive and hold an antenna comprising a magnetic base or mount.

2. The antenna mounting device of claim 1, wherein said body includes a first leg and a second leg and wherein said first mounting end is provided on said first leg and said second mounting end is provided on said second leg.

3. The antenna mounting device of claim 1, further including a second non-ferromagnetic one-piece L-shaped body having a third mounting end with said first cross section and a fourth mounting end with said second cross section.

4. The antenna mounting device of claim 3, further including an accessory bar connected between said body and said second body.

5. The antenna mounting device of claim 4, wherein said accessory bar is made of non-ferromagnetic material.

6. The antenna mounting device of claim 5, further including a second ferromagnetic antenna anchor disc carried on said second body and adapted to receive and hold an antenna comprising a magnetic base or mount.

7. The antenna mounting device of claim 6, further including a third ferromagnetic antenna anchor disc carried on said accessory bar and adapted to receive and hold an antenna comprising a magnetic base or mount.

8. The antenna mounting device of claim 1 wherein said accessory bar includes a first end received over said second mounting end and a second end received over said fourth mounting end.

9. The antenna mounting device of claim 8, wherein said body includes a first leg and a second leg wherein said first mounting end is provided on said first leg and said second mounting end is provided on said second leg.

10. The antenna mounting device of claim 9, wherein said second body includes a third leg and a fourth leg wherein said third mounting end is provided on said third leg and said fourth mounting end is provided on said fourth leg.

11. A truck equipped with said antenna mounting device of claim 1 wherein said antenna mounting device is mounted to said truck either by engaging said first mounting end into a stake pocket of said truck or engaging said second mounting end into a trailer hitch receiver carried on said truck.

12. A method of mounting an antenna to a motor vehicle using an antenna mounting device having a one-piece L-shaped body including a first mounting end of a first cross section, a second mounting end of a second, different cross section, and a ferromagnetic antenna anchor disc, comprising:
   securing said antenna mounting device to said motor vehicle by either engaging said first mounting end within a first structure of said motor vehicle or engaging said second mounting end in a second structure of said motor vehicle; and
   mounting an antenna having a magnetic base or mount to said ferromagnetic antenna anchor disc.

13. The method of claim 12, including inserting said first mounting end into a stake pocket of said motor vehicle.

14. The method of claim 12, including inserting said second mounting end into a hitch receiver carried on said motor vehicle.

15. The method of claim 12, including:
   securing a first component of said antenna mounting device in a first stake pocket of said motor vehicle and a second component of said antenna mounting device into a second stake pocket of said motor vehicle on an opposite side of said motor vehicle from first said stake pocket; and
   bridging a payload bed of said motor vehicle with an accessory bar connected to said first component and said second component.

16. The method of claim 15, including securing said antenna mounting device in said first stake pocket of said motor vehicle by means of a latch mechanism.

* * * * *